United States Patent [19]

Mohamed

[11] Patent Number: 5,754,818

[45] Date of Patent: May 19, 1998

[54] ARCHITECTURE AND METHOD FOR SHARING TLB ENTRIES THROUGH PROCESS IDS

[75] Inventor: Ahmed Hassan Mohamed, Berkeley, Calif.

[73] Assignee: Sun Microsystems, Inc., Mountain View, Calif.

[21] Appl. No.: 620,464

[22] Filed: Mar. 22, 1996

[51] Int. Cl.[6] .................................................. G06F 12/10
[52] U.S. Cl. ........................... 395/417; 395/420; 395/678
[58] Field of Search ..................................... 395/415, 416, 395/417, 471, 483, 677, 678, 418, 419, 420

[56] References Cited

U.S. PATENT DOCUMENTS

| | | | |
|---|---|---|---|
| 4,136,385 | 1/1979 | Gannon et al. | 395/417 |
| 4,525,778 | 6/1985 | Cane | 395/417 |
| 4,811,209 | 3/1989 | Rubinstein | 395/471 |
| 5,319,760 | 6/1994 | Mason et al. | 395/418 |
| 5,319,761 | 6/1994 | Chiarot et al. | 395/417 |
| 5,630,087 | 5/1997 | Talluri et al. | 395/412 |

OTHER PUBLICATIONS

"Architectural Support for Single Address Space Operating Systems" by Koldinger, et al., Department of Computer Science and Engineering, University of Washington, Seattle, WA (1992) P175–186.

"Improving the Address Translation Performance of Widely Shared Pages" by Khaladi and Talluri, Sun Microsystems Laboratories (Feb. 1995).

Primary Examiner—Tariq R. Hafiz
Assistant Examiner—Kevin Verbrugge
Attorney, Agent, or Firm—Blakely Sokoloff Taylor & Zafman

[57] ABSTRACT

An address translation control circuit which operates in connection with a processor and a translation look-aside buffer ("TLB") to perform virtual-to-physical address translations through shared entries of the TLB. The address translation control circuit comprises a primary context storage element, a group context storage element, a context matching circuit, a comparing unit and a logic unit. The context matching circuit is coupled to primary and group context storage elements to receive their context numbers and reads a context identification number and a context select bit value from a chosen translation entry of the TLB. Concurrently, the comparing unit compares the virtual address contained in that entry with the virtual address requested for translation by the processor. The logic unit receives the outputs from the context matching circuit and the comparing unit and signals operating system software whether an appropriate translation has been found in the TLB.

20 Claims, 5 Drawing Sheets

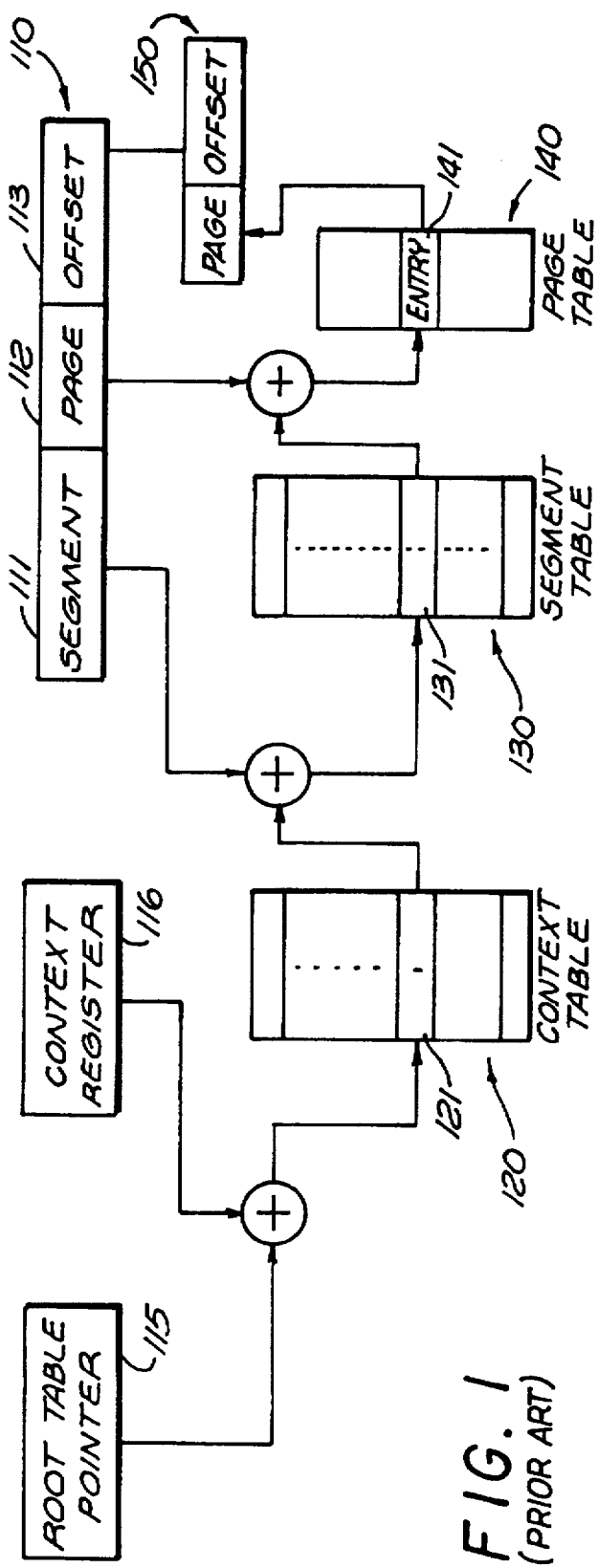
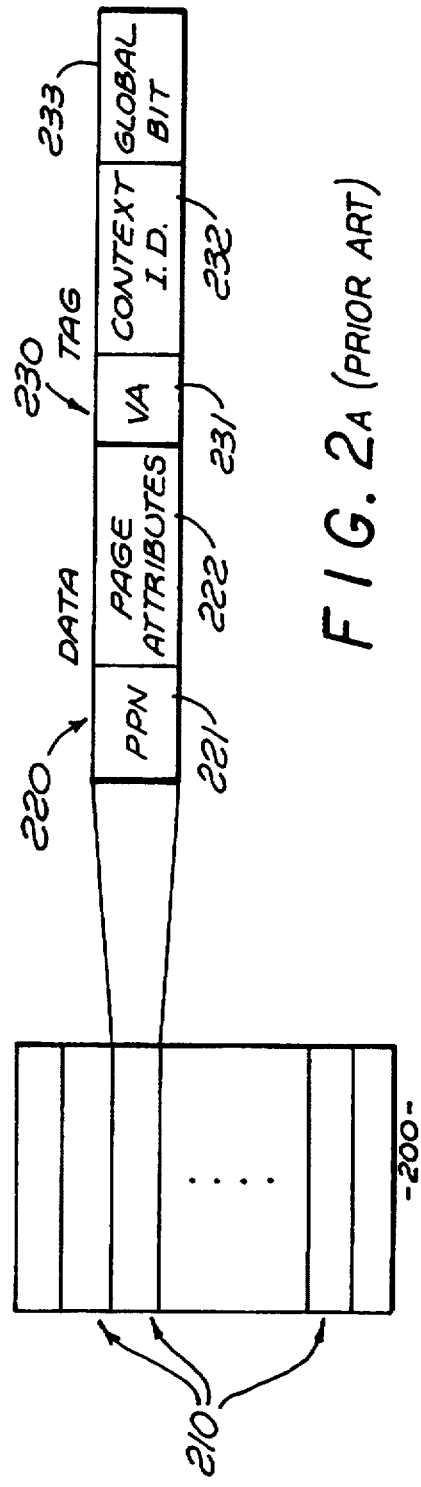
FIG. 1 (PRIOR ART)
FIG. 2A (PRIOR ART)

S = 1 ; MASK/ID IS A N-BIT MASK

S = 0 ; MASK ID IS A M-BIT IDENTIFIER

ARCHITECTURE AND METHOD FOR SHARING TLB ENTRIES THROUGH PROCESS IDS

BACKGROUND OF THE INVENTION

1. Field of the Invention

The invention relates in general to the field of electronic addressing. More particularly, the present invention relates to an addressing architecture and method for improving its performance by sharing translation table entries of a translation look-aside buffer.

2. Description of Art Related to the Invention

Currently, there exists various addressing architectures implemented within a computer to perform virtual-to-physical address translations. These addressing architectures typically are implemented as a memory management unit ("MMU") operating in combination with a processor of the computer to perform a particular address translation scheme such as, for example, a "forwarded page table" scheme of FIG. 1.

The forwarded page table scheme 100 involves the translation of a virtual address 110 into a physical address 150 by accessing three distinct tables in succession; namely, a Context table 120, a Segment table 130 and a Page table 140. More specifically, the virtual address 110 is translated into the physical address 150 by first combining the contents of a processor register set up during initialization of the MMU (i.e., Root Table pointer 115) and information within a Context register 116. The Context register 116 is a storage element (e.g., processor register) that stores information to uniquely identify processes that possess the same virtual address. By combining the Root Table pointer 115 with the information of the Context register 116, a pointer to an entry 121 of the Context table 120 is produced. This entry 121 is used as an index for accessing the contents of an entry 131 from the Segment table 130 having its base address set by the contents of the Segment portion 111 of the virtual address 110. Likewise, the contents of the entry 131 are used as an index for the Page table 140 having a page portion 112 as its base address in order to access the contents of a page entry 141. The contents of the page entry 141 combined with a page offset 113 of the virtual address 110 form the physical address 150.

Due to the advent of processors supporting a 64-bit address space, there are a number of disadvantages associated with a MMU that utilizes the forwarded page table scheme. One disadvantage is that this scheme requires sharing to be at a granularity of a table (e.g., 256 kilobytes for a SuperSPARC™ architecture, 4 megabytes for a MIPS® architecture). Thus, architectures that support the forwarded page table scheme require all participants to share all physical pages mapped by the Page table rather than sharing of mappings for an arbitrary set of virtual pages. Another disadvantage associated with the forwarded page table scheme is that as 64-bit address space is used more often, a large amount of physical memory would be required to support fixed size virtual-to-physical address translation tables. This is not a cost efficient approach. Yet another disadvantage is that this scheme imposes alignment requirements because the virtual address that is used for sharing an object must be properly aligned on a segment or page table boundary. This is necessary to maintain sharing at a page table granularity as mentioned above.

Over the last few years and due, in part, to apparent acceptance of 64-bit address space, there has been a dramatic need for computer architectures that support virtual memory through software-managed translation look-aside buffers ("TLBs") which does not impose any fixed page table requirements. A TLB is a small cache that is primarily managed by an operating system of the computer. The TLB includes memory containing a translation table and tag comparison circuitry to signal the operating system software whether a translation table entry ("TTE") contains information pertaining to a requested address translation as shown in FIG. 2B.

Referring now to FIG. 2A, the data structure of the translation table 200 of the TLB includes a number of entries ("TTEs") 210 in which each TTE includes data 220 and a tag 230. The TTE tag 230 includes a pre-stored virtual address ("VA") 231, a process context identification ("Context ID") 232 which is used to uniquely identify a process and a global bit 233. The data includes a physical page number ("PPN") 221 and page attribute (e.g., protection, reference, modify, etc.) 222.

The tag comparison circuitry employed to support the conventional software-managed TLB translation scheme is shown in FIG. 2B. This circuitry 250 receives the TTE tag 230 and inputs the Context ID 232 into one input of a dual-input comparator 255. The circuitry 250 further includes a context register 260 which contains a selected context number loaded by the operating system at a specific context switching time to represent a process system state of the computer. If the comparator 255 determines that the Context ID 232 is equivalent to the selected context number contained in the context register, the comparator 255 activates a control line 261 coupled to a first input of a first logic gate 262. In this embodiment, the first logic gate 262 is designed to operate as an OR gate. If either the control line 261 is activated or the global bit 233 is active, the first logic gate 262 activates a control line 263 coupled to a first input of a second logic gate 265.

Additionally, the pre-stored virtual address 231 contained in the TTE tag 230 is compared to a requested virtual address that was provided directly by the processor to be translated which is referred to as the "processor virtual address" 236. This comparison is performed by a second comparator 270. If these virtual addresses are identical (bitwise comparison) or equivalent (bitwise or non-bitwise comparison), the second comparator 270 activates a control line 264 coupled to a second input of the second logic gate 265. If both inputs receive "active" signals, the second logic gate 265 transmits a translation "Hit" signal to instruct operating system software that the translation was found in the translation table of the TLB. Otherwise, the translation would be obtained from an entry within the kernel page table which contains all virtual-to-physical address translations.

In general, the above-described conventional software-managed TLB translation scheme allows multiple processes to share physical objects (e.g., shared libraries, memory, etc.). These processes may use a single virtual address to map to a shared physical page. However, this translation scheme fails to optimize allocated memory usage such as kernel memory and the TLB because it assigns separate page table entries and TTEs to each separate process even if these processes are using the same translation information.

Recently, another translation scheme has been introduced to allow translations from different address spaces using similar virtual addresses that map to the same physical address space to share a single translation entry. This scheme is referred to as a "common mask" scheme. As shown in FIG. 2C, the common-mask scheme extends the Context ID 232 of a TTE 210 with a bit vector 234 that identifies a set of common regions (i.e., shared physical pages) to be shared by the process upon activating a shared bit 235. Otherwise, when the shared bit 235 is inactive, the bit vector 234 represents an original Context ID as used in for non-shared translations. The common mask scheme is disclosed in a Sun Microsystems Laboratories publication entitled "Improving the Address Translation Performance of Widely Shared Pages" authored by Yousef A. Khalidi and Madhusudhan Talluri. However, the common mask mapping scheme is costly to manage by requiring a complex addressing architecture.

As stated, the common mapping scheme of FIG. 2C is limited and costly to manage. For example, where the context register is equal to "m+n" bits in size, the common mask architecture may allocate "m" bits to uniquely identify the process and "n" bits in the context identifier for the mask, the total number of objects that can be shared at any given time is limited to "n" objects. As a result, the operating system must allocate these "n" bits judiciously which requires additional system overhead for allocation control.

On the other hand, the proposed addressing architecture uses the full context identifier as a number which provides the system with $2^{m+n}$ of groups. In turn, each process group can share multiple objects limited only by the size of the virtual address space. We can exploit program's locality to support multiple group membership. On a page fault, the operating system can load the group context register with the corresponding group identifier for the object being accessed. Since this is a minor page fault, performance is not substantially degraded.

The focus of this invention resides in an improved addressing architecture which utilizes additional information to be stored in the TTE tag in order to optimize usage of the translation table of the TLB.

SUMMARY OF THE INVENTION

An address translation control circuit which operates in connection with a processor and a translation look-aside buffer ("TLB") to translate a virtual address into a physical address while utilizing shared entries of the TLB. Each entry of a translation table of the TLB includes at least a pre-stored virtual address, a context identification number and a context select bit. The preferred embodiment of the address translation control circuit comprises a primary context storage element, a group context storage element, a context matching circuit, a comparing unit and a logic unit. The context matching circuit is coupled to primary and group context storage elements to receive their context numbers and to read the context identification number and context select bit value from a chosen translation table entry. Concurrently, the comparing unit compares the pre-stored virtual address contained in the entry with the requested virtual address. The logic unit receives the output of the context matching circuit and the comparing unit to signal the operating system software whether or not the appropriate virtual-to-physical address translation is contained in the TLB. Active outputs from the context matching circuit and the comparing unit indicate that the translation is contained in the TLB.

There are two preferred embodiments of the context matching circuit. The first embodiment includes a multiplexing unit and a comparing unit. The multiplexing unit outputs a selected context number, which is one of the context numbers provided by the primary context storage element and the group context storage element depending on the bit value of the context select bit. The comparing unit compares the selected context number with the context identification number to check if a match exists. If so, it outputs an active context matching signal to the logic unit. The second embodiment includes the use of a pair of comparing units in combination with certain logic gates to avoid the use of multiplexing unit which is more difficult to implement.

BRIEF DESCRIPTION OF THE DRAWINGS

The features and advantages of the present invention will become apparent from the following detailed description of the present invention in which:

FIG. 1 is an illustration of a conventional forwarded page table mapping scheme.

FIG. 2A is a block diagram a data structure of the translation table of the TLB and a TTE entry.

DETAILED DESCRIPTION OF THE INVENTION

The present invention describes an improved addressing architecture which allows a number of processes to share the same translation table entry ("TTE") of a translation look-aside buffer ("TLB") when sharing address translation resources. Although numerous specific details are set forth, it is obvious that these specific details are not required to practice the invention. In other instances, well known circuits, devices and the like may not be discussed to avoid obscuring the present invention.

Certain well-known terminology is generally defined herein. For example, a "process" is defined as a sequence of operational steps performed by a processor which rely on address translation resources (i.e., assigned code, data, stack, shared library) for successful execution. Each process is assigned a unique address translation handle. A "group of processes" is a collection of processes cooperating together to perform a specific operation. The term "activated" or "active" indicates that a signal propagating through a communication line is "logic high" or the signal is "logic low" if it is an active-low signal.

Figure 2B:
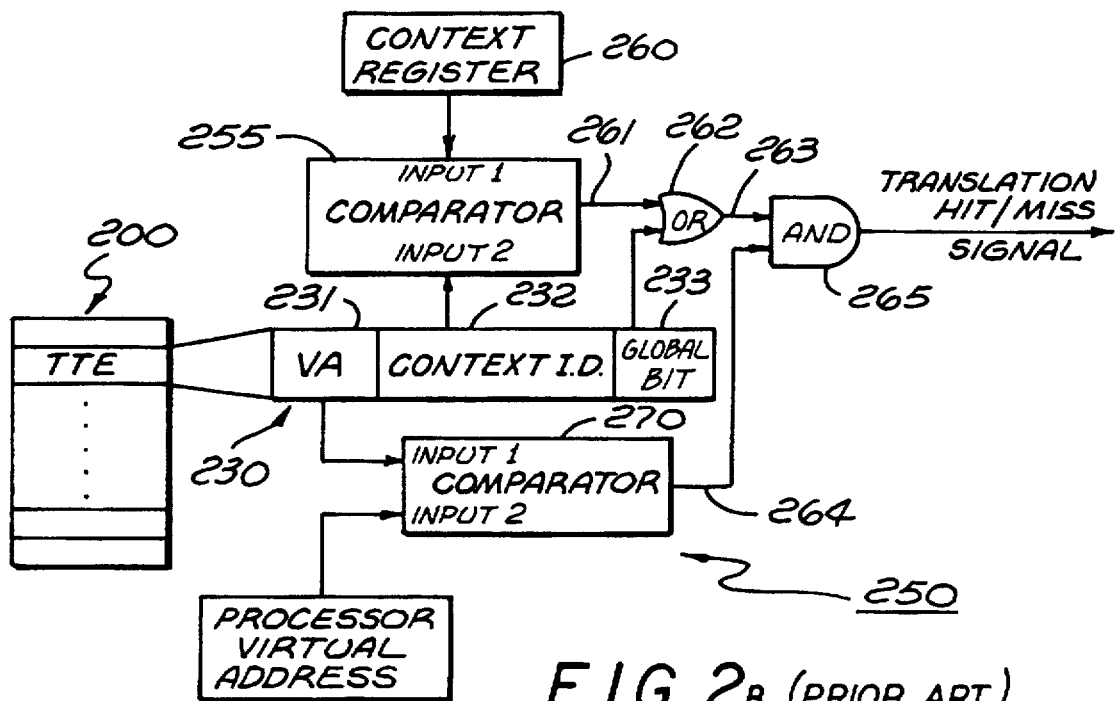
FIG. 2B is a block diagram of conventional tag comparison circuitry used in association with the translation table of the TLB.
Figure 2C:
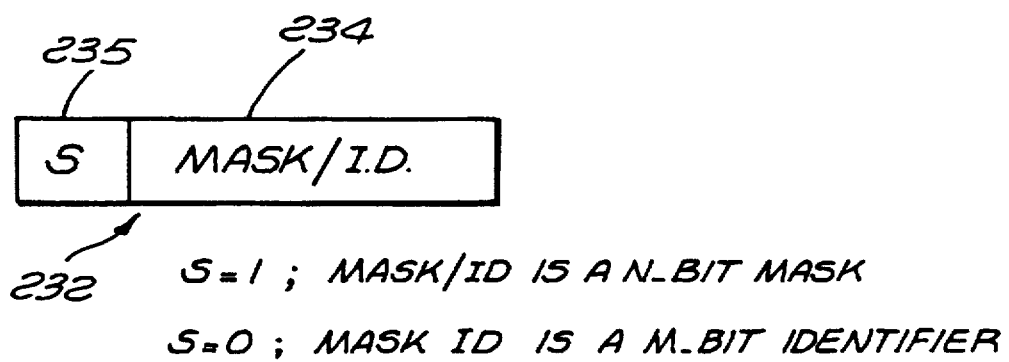
FIG. 2C is a block diagram of the data structure of the Context ID of a TTE supporting a common mask translation scheme.
Figure 3:
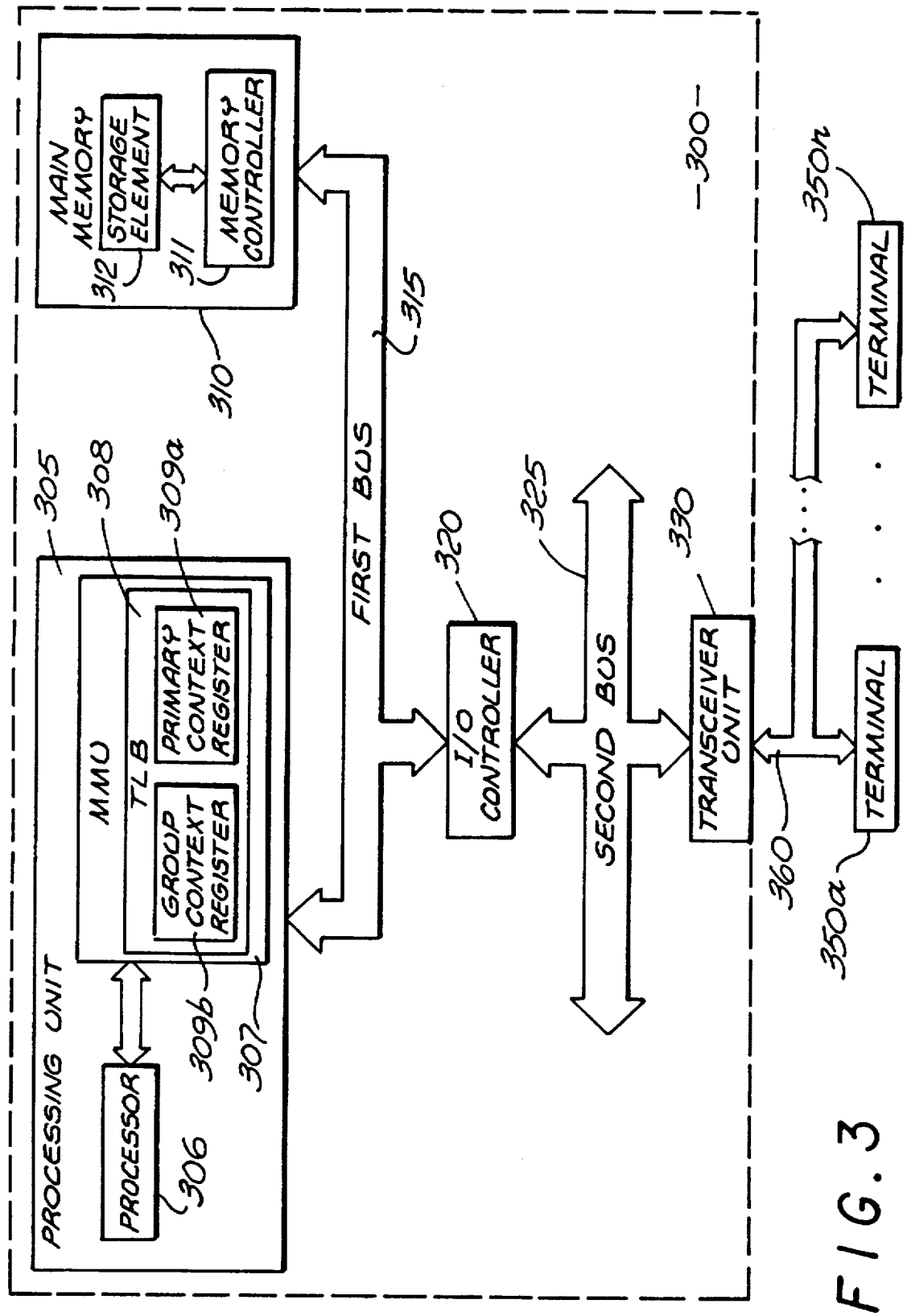
FIG. 3 is a block diagram of a computer system employing an improved software managed TLB translation scheme.

Referring to FIG. 3, a simplified embodiment of a computer system employing the improved addressing architecture of the present invention is shown. The computer system 300 is coupled to a plurality of terminals (e.g., personal computers, dumb terminals, etc.) 350a–350n via communication link(s) 360. The computer system 300 comprises a processing unit 305 and main memory 310 coupled together through a first bus 315. The first bus 315 is coupled to an input/output controller 320 which provides a communication path between the first bus 315 and a second bus 325 (e.g., an I/O bus). The second bus 325 propagates information originating from one of the plurality of terminals 350a–350n received from a transceiver unit 330 (e.g., modem).

As further shown in FIG. 3, the processing unit 305 includes a processor 306 and a memory management unit ("MMU") 307 which is used by the processor 306 to translate virtual addresses into physical addresses when accessing data from main memory 310. The MMU 307 includes a TLB 308 primarily under control by both operating system software (not shown) and its address translation control circuitry and a plurality of context storage elements (e.g., registers and other storage components), namely a primary context storage element 309a and at least one group context storage element 309b. The primary context storage element 309a contains a context identification number used to uniquely define the current process while the group context storage element 309b is used as the context identification for those processes sharing physical pages. The main memory 310 usually includes a memory controller 311 which receives a physical address from the processor 306 and controls access of data from a storage element 312 such as, for example, dynamic random access memory ("DRAM"), video random access memory ("VRAM") and the like.

The computer system 300 undergoes virtual-to-physical address translations as described. First, the processor 306 generates a requested virtual address and transfers the requested virtual address into the MMU 307. The MMU 307, particularly the address translation control circuitry, performs a physical address lookup in which it utilizes the requested virtual address and context information (i.e., global bit, context select bit and Context ID described below) to ascertain whether translation information for the requested virtual address is stored in the TLB 308. If the physical address for the requested virtual address is contained in the TLB 308, the TLB 308 outputs a translation "Hit" signal and then passes the physical address to the processor 306. Otherwise, if the physical address is not contained in the TLB 308, the MMU 307 generates a trap by transmitting a translation "Miss" signal to the processor 306. Thereafter, the operating system software performs a lookup of the kernel page table containing all virtual-to-physical address translations to obtain the physical address and provides the processor 306 that address.

Figure 4:
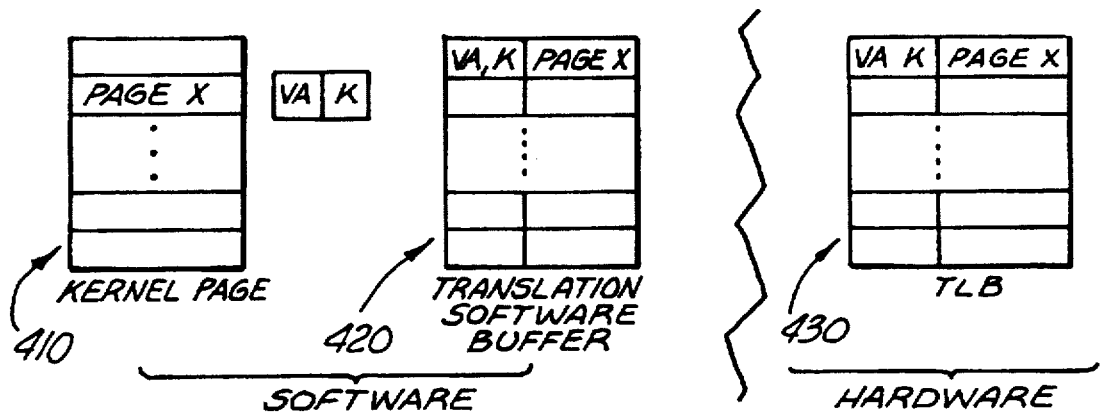
FIG. 4 is a diagram of the data structures illustrating an improved software-managed TLB translation scheme.

Referring to FIG. 4, the data structures of the operating system software and TLB which collectively perform address translations is shown. These data structures are additionally disclosed in concurrently filed U.S. patent application Ser. No. 08/643,047 entitled "Separate Code And Data Contexts: An Architectural Approach To Virtual Text Sharing" by Applicant of the present application incorporated herewith by reference. The data structures include a kernel page table 410, a translation software buffer 420 and a TLB 430. The kernel page table 410 manages all physical pages associated with physical memory. The translation software buffer 420 operates basically as a cache of the most recently used address translations. This increases the speed of the translation scheme and is preferably implemented, although it is clearly optional. The TLB 430 is memory (e.g., a translation table) controlled by address translation control circuitry to operate in a manner similar to that of a cache. The TLB 430 receives a tag of a selected translation table entry ("TTE") and utilizes bit portions of the TTE tag to ascertain whether the physical address associated with the requested virtual address is stored in the TLB 430.

Referring still to FIG. 4, it is evident that resources are duplicated when different processes are running the same application and referencing the same physical pages through the same virtual addresses. Essentially, by ascertaining the number of processes using a common segment and factorizing the common segment into a proxy address space identified by a group context number "k", a group process is formed. This group process utilizes only one TTE associated with multiple processes so long as this address translation scheme adopts the following conditions to guarantee accurate addressing. One condition is that all shared segments must be mapped to the same virtual address for all participants. This will guarantee that address translations from virtual to physical for shared segments are identical for all processes in the group. The second condition is that the address space addressed by the group context number is distinct from each private address space associated with the primary context number. In other words, a virtual address that accesses a shared segmented in one process must access the same shared segment in all processes for that group. This prevents a process within a group from mapping a private segment at a virtual address while the rest of the group is for a different shared segment.

Figure 5:
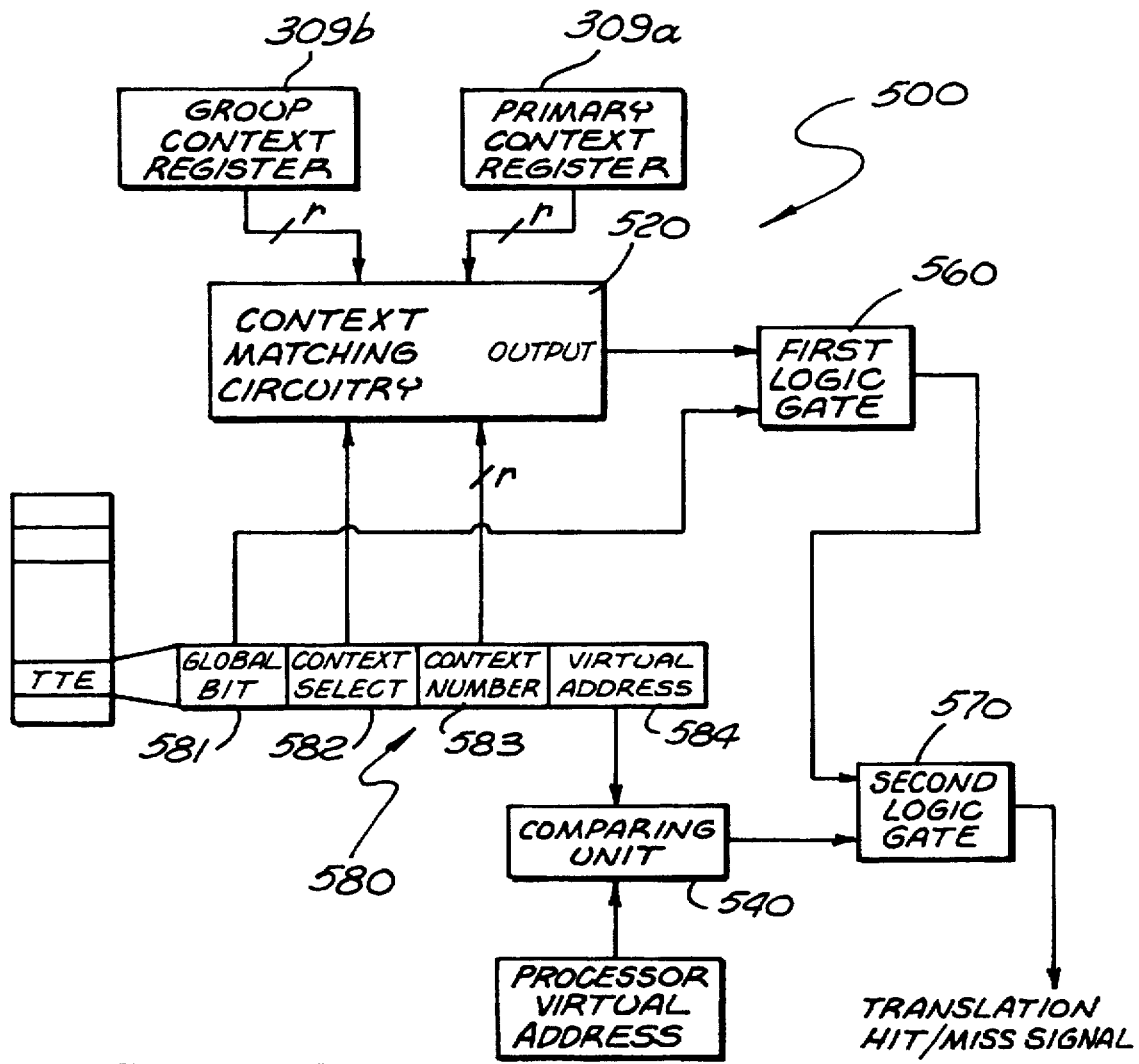
FIG. 5 is an illustrative embodiment of the addressing translation control circuitry that supports the improved software managed TLB translation scheme.

Referring to FIG. 5, the address translation control circuitry 500 associated with each entry of the TLB includes a context matching circuit 520, at least one comparing unit 540 and a plurality of logic gates 560 and 570. The address translation control circuitry 500 receives context information from both the primary context storage element 309a and the group context storage element 309b implemented within the computer architecture. These context storage elements 309a–309b contain a context number being "m" bits in size ("m" being an arbitrary size). In addition, the address translation control circuitry 500 receives the TTE tag 580 associated with a particular process or group of processes. As shown, the TTE tag 580 is modified to contain a number of bit fields including, but not limited to, a global bit field 581, a context select bit field 582, a context number bit field 583 and a bit field containing the pre-stored virtual address 584. Preferably, the TTE tag 230 is 64 bits wide ("TAG [63:0]") in which the pre-stored virtual address is 42 bits wide ("TAG[41:0]"), the context number field is 13 bits wide ("TAG[60-48]"), and the context select and global bit fields ("TAG[62]" and "TAG[63]") are a single bit wide. It is obvious that the fields of the TTE tag 230 may be other bit sizes depending on a chosen computer architecture.

The context matching circuitry 520 is configured to compare a context identification number contained in the context number bit field 583 ("r" bits in size) in the TTE tag 580 to either the context number contained in the primary context storage element 309a or the group context storage element 309b. The context select bit 582 dynamically selects which context number is compared with the context identification number from the TTE tag 580; namely, whether the context number is obtained from the primary context storage element 309a (when the context select bit 582 is inactive) or from the group context storage element 309b (when the context select bit 582 is active). If the pre-stored virtual address 584 is associated with "shared" pages, the operating system software loads an active context select bit 582. Otherwise, if the pre-stored virtual address 584 is associated with "non-shared" page, the context select bit 582 is inactive.

If a context matching circuit 520 determines that the context numbers match, it inputs an active context matching signal into a first input of a first logic gate 560. The first logic gate 560 functions as an OR gate. Otherwise, an inactive context matching signal is transferred to the first input of the first logic gate 560. Additionally, the global bit 581 is input into a second input of the first logic gate 560 because certain translations may be context independent. For example, the global bit 581 provides the operating system with a mechanism to use a single TTE for itself because all processes map the operating system kernel at the same virtual address in their address space. However, this architecture is used less frequently because the operating systems are now allocated a separate protection domain thereby allowing the operating system to have a larger virtual address. Since the global bit 581 may not be used in many current architectures, it's use is optional to the addressing architecture.

If one of the inputs of the first logic gate 560 receive an active signal, the first logic gate 560 transfers an active signal to a first input of a second logic gate 570. Of course, if the global bit 581 is not used by the addressing architecture, logic gate 560 is removed and the output of the context matching circuitry 520 may be routed to the second logic gate 570 in this embodiment. The second logic gate 570 preferably functions as an AND gate. A second input of the second logic gate 570 is coupled to an output of a comparing unit 540 that compares the pre-stored virtual address contained in the TTE tag to the requested virtual address provided by the processor. If these virtual addresses are identical, indicating that the TTE contains correct translation information, the comparing unit 540 outputs an active comparison signal into the second input of the second logic gate 570. This causes the second logic gate 570 to output a translation "Hit" signal to the processor to indicate that the address translation can be supported by the TLB. Otherwise, if the first logic gate 560 (or context matching circuitry absent the global bit) produces an inactive signal or the comparing unit 540 produces an inactive signal, the address translation circuitry 500 outputs a translation "Miss" signal indicating that the translation is not contained in the TLB so access to the kernel page table is needed.

Figure 6A:
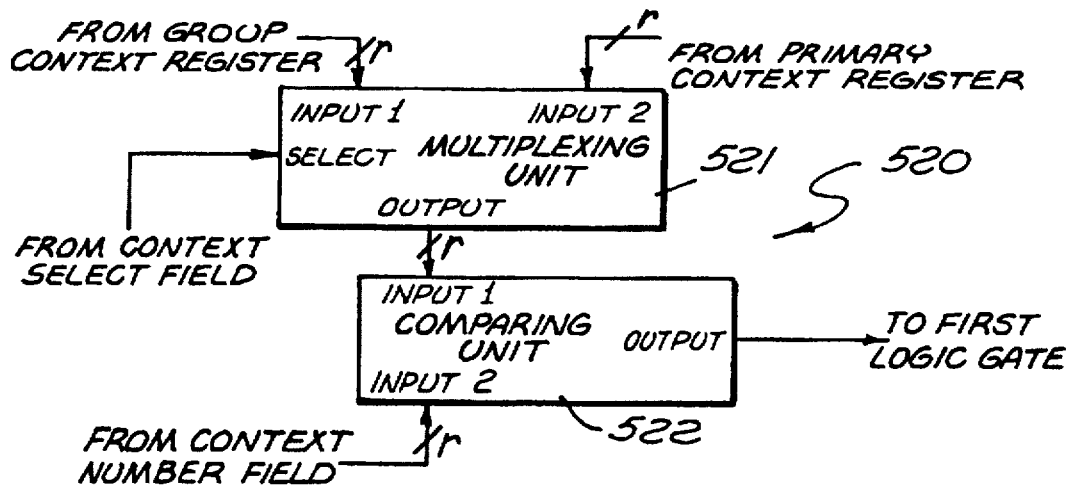
FIG. 6A is a detailed block diagram of one embodiment of the context matching circuit of FIG. 5.
Figure 6B:
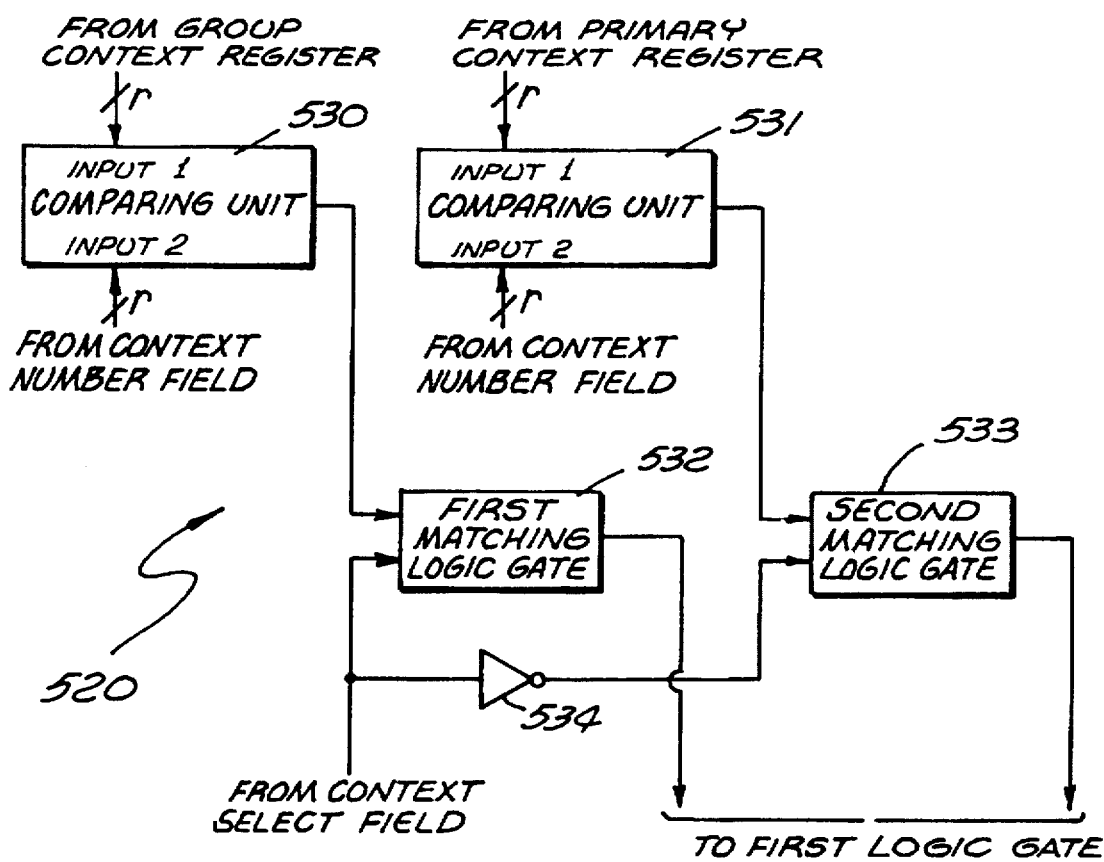
FIG. 6B is another illustrative embodiment of the context matching circuit of FIG. 5.

Referring to FIGS. 6A and 6B, illustrative embodiments of the context matching circuitry 520 is shown. In FIG. 6A, the context matching circuitry 520 is illustrated as a multiplexing unit 521 and a comparing unit 522. The multiplexing unit 521 features "r" dual-input multiplexers receiving as inputs the context numbers of the primary context storage element 309a and the group context storage element 309b and a select signal based on the bit value of the context select bit of the TTE tag. However, other implementations may be utilized depending on the bit size of the context select field and arrangement and characteristics of the multiplexers. The comparing unit 522 is shown as a dual-input comparator although other components are available.

In this embodiment, whichever context number is selected according to the context select bit, it is input into a first input of the comparing unit 522. The context identification number contained in the TTE tag is input into a second input of the comparing unit 522 and these values are compared. If they are identical, the comparing unit 522 outputs the active comparison signal into the first input of the first logic gate 560. Otherwise, it outputs the inactive comparison signal into the first logic gate 560.

As shown in FIG. 6B, another embodiment of the context matching circuitry is shown. In this embodiment, the context numbers of both the group context storage element and the primary context storage element are input into a first inputs of comparing units 530 and 531, respectively. These context numbers are compared in parallel with the context identification number provided by the TTE tag. As a result, the comparing units 530 and 531 produce respective comparison signals which are input into a first input of a first and second matching logic gates 532 and 533 each functioning as an AND gate. The first matching logic gate 532 receives as a second input the context select bit value from the TTE tag. The second matching logic gate 533 receives as a second input the complement of the context select bit because the bit value of the context select is inverted by an inverter gate 534. Thus, only one of the first and second matching logic gates 532 and 533 outputs an active signal to the first logic gate 560 of FIG. 5. Therefore, for this embodiment, the first logic gate 560 requires three inputs operating as a three-input OR gate if global bit used or a two-output OR gate if not used.

The benefit associated with the second embodiment of the context matching circuit is associated with reducing the amount of logic within the address translation control circuitry. In this case, a n-bit comparator and a 2-bit multiplexer are required instead of a n-bit multiplexer which is more difficult to implement. In addition, the comparisons can be processed in parallel which reduces the total gate-delay of the system.

Thus, an improved addressing scheme has been described. To one skilled in the art, alternative embodiments of the invention will be apparent. The preferred embodiments are used for illustrative purposes and should not be taken as limiting the scope of the invention.

What is claimed is:

1. An address translation control circuit configured to operate in connection with a processor and a translation look-aside buffer that includes a translation table having at least one translation table entry including a pre-stored virtual address and a context identification number and also configured to translate a requested virtual address from the processor into a physical address, the address translation control circuit comprising:

a plurality of context storage elements, wherein a first context number is contained in a first context storage element and a second context number is contained in a second context storage element; and circuitry coupled to said plurality of context storage elements, said circuitry being configured to output a translation Hit signal to indicate that the translation look-aside buffer is currently storing the physical address when said context identification number is equivalent to a selected context number being one of said first and second context numbers and the pre-stored virtual address is equivalent to the requested virtual address.

2. The address translation control circuit according to claim 1, wherein said circuitry of the address translation control circuit includes a context matching circuit configured to (i) receive said first and second context numbers and said context identification number and (ii) output at least one context matching signal indicating whether said context identification number is equivalent to a selected context number being one of said first and second context numbers;

a comparing unit configured to (i) compare the requested virtual address with the pre-stored virtual address and (ii) output a comparison signal indicating whether the pre-stored virtual address is equivalent to the requested virtual address; and a logic unit coupled to said context matching circuit and said comparing unit, said logic unit is configured to output said translation Hit signal if said context matching signal indicates that said context identification number is equivalent to said selected context number and said comparison signal indicates that the pre-stored virtual address is equivalent to the requested virtual address.

3. The address translation control circuit according to claim 2, wherein said context matching circuit of said circuitry includes
   a multiplexing unit configured to receive as inputs said first context number, said second context number and a context select bit from the at least one translation table entry; and
   a second comparing unit configured to receive and compare an output of said multiplexing unit with the context identification number from the at least one translation table entry.

4. The address translation control circuit according to claim 2, wherein said context matching circuit of said circuitry includes
   a first comparing unit configured to (i) receive and compare said first context number with said context identification number and (ii) output a first comparing signal indicating whether said first context number is equivalent to said context identification number;
   a first matching logic gate configured to (i) receive as inputs said first comparing signal and a context select bit and (ii) output a first context matching signal to said logic unit; and
   a second comparing unit configured to (i) receive and compare said second context number with said context identification number and (ii) output a second comparing signal indicating whether said second context number is equivalent to said context identification number;
   an inverter configured to receive and complement said context select bit; and
   a second matching logic gate configured to (i) receive as inputs said second comparing signal and said complement of said context select bit and (ii) output a second context matching signal to said logic unit.

5. The address translation control circuit according to claim 4, wherein said logic unit of said circuitry includes
   a first logic gate configured to (i) receive as inputs said first and second context matching signals and (ii) produce a first logic output signal if one of said first and second context matching signals is active; and
   a second logic gate configured to (i) receive as inputs said first logic output signal and said comparison signal and (ii) output said translation Hit signal if said first logic output signal is indicating that said context identification number is equivalent to one of said first and second context numbers and said comparison signal is indicating that the pre-stored virtual address is equivalent to the requested virtual address.

6. The address translation control circuit according to claim 4, wherein said logic unit of said circuitry includes
   a first logic gate configured to (i) receive as inputs said first and second context matching signals and a global bit from the at least one translation table entry and (ii) produce a first logic output signal indicating that one of a plurality of conditions exists, whereas said plurality of conditions include said context identification number being equivalent to said selected context number and a translation associated with the requested virtual address is context independent; and
   a second logic gate configured to (i) receive as inputs said first logic output signal and said comparison signal and (ii) output said translation Hit signal if said first logic output signal is indicating that one of said plurality of conditions exists and said comparison signal is indicating that the pre-stored virtual address is equivalent to the requested virtual address.

7. An address translation control circuit configured to operate in connection with a processor and a translation look-aside buffer that includes a translation table having at least one translation table entry including a pre-stored virtual address and a context identification number and also configured to translate a requested virtual address from the processor into a physical address, the address translation control circuit comprising:
   a primary context storage element configured to store a first context number;
   a group context storage element configured to store a second context number;
   a context matching circuit configured to receive said first context number from said primary context storage element, said second context number from said group context storage element and said context identification number from the at least one translation table entry and to output at least one context matching signal indicating whether said context identification number is equivalent to a selected context number being one of said first and second context numbers;
   a comparing unit configured to compare the pre-stored virtual address with the requested virtual address and to output a comparison signal indicating whether the pre-stored virtual address is equivalent to the requested virtual address; and
   a logic unit coupled to said context matching circuit and said comparing unit, said logic unit being configured to output a translation Hit signal if said context matching signal indicates that said context identification number is equivalent to said selected context number and said comparison signal indicates that the pre-stored virtual address is equivalent to the requested virtual address.

8. A computer system comprising:
   a bus; and
   a processing unit coupled to said bus, said processing unit including
      a processor configured to issue a request to translate a requested virtual address into a physical address, and
      a memory management unit coupled to said processor, said memory management unit including
         a translation look-aside buffer including a translation table, said translation table having at least one translation table entry including a pre-stored virtual address and a context identification number, and
         an address translation control circuit configured to (i) receive a first context number, a second context number and said context identification number and (ii) output a translation Hit signal to indicate that the translation look-aside buffer is currently storing the physical address when said context identification number is equivalent to a selected context number being one of said first and second context numbers and the pre-stored virtual address is equivalent to the requested virtual address.

9. The computer system according to claim 8, wherein said address translation control circuit of said memory management unit includes
   a plurality of context storage elements, wherein said first context number is contained in a first context storage element and said second context number is contained in a second context storage element; and circuitry coupled to said plurality of context storage elements, said circuitry being configured to output said translation Hit signal.

10. The computer system according to claim 9, wherein said circuitry of said address translation control circuit includes a context matching circuit configured to receive said first and second context numbers and said context identification number and to output at least one context matching signal indicating whether said context identification number is equivalent to a selected context number being one of said first and second context numbers;

a comparing unit configured to compare the pre-stored virtual address with the requested virtual address and to output a comparison signal indicating whether the pre-stored virtual address is equivalent to the requested virtual address; and a logic unit coupled to said context matching circuit and said comparing unit, said logic unit is configured to output a translation Hit signal if said context matching signal indicates that said context identification number is equivalent to said selected context number and said comparison signal indicates that the pre-stored virtual address is equivalent to the requested virtual address.

11. The computer system according to claim 10, wherein said at least one context matching signal from said context matching circuit is active if said selected context number is equivalent to said context identification number.

12. The computer system according to claim 11, wherein said comparison signal from said comparing unit is active if said requested virtual address from the processor is equivalent to said pre-stored virtual address.

13. The computer system according to claim 12, wherein said logic unit of said address translation control circuit includes a first logic gate configured to (i) receive as inputs said first and second context matching signals and (ii) produce a first logic output signal to indicate that one of said first and second context matching signals is active; and a second logic gate configured to (i) receive as inputs said first logic output signal and said comparison signal and (ii) output said translation Hit signal if said first logic output signal indicates that said context identification number is equivalent to one of said first and second context numbers and said comparison signal indicates that the pre-stored virtual address is equivalent to the requested virtual address.

14. The computer system according to claim 10, wherein said logic unit of said address translation control circuit includes a first logic gate configured to (i) receive as inputs said first and second context matching signals and a global bit from the at least one translation table entry and (ii) produce a first logic output signal indicating that one of a plurality of conditions exists, whereas said plurality of conditions include said context identification number being equivalent to said selected context number and a translation associated with the requested virtual address is context independent; and a second logic gate configured to (i) receive as inputs said first logic output signal and said comparison signal and (ii) output said translation Hit signal whether said first logic output signal indicates that one of said plurality of conditions exists and said comparison signal indicates that the pre-stored virtual address is equivalent to the requested virtual address.

15. The computer system according to claim 10, wherein said context matching circuit of said address translation control circuit includes a multiplexing unit configured to receive as inputs said first context number, said second context number and a context select bit from the at least one translation table entry; and a second comparing unit configured to receive and compare an output of said multiplexing unit with the context identification number from the at least one translation table entry.

16. The computer system according to claim 10, wherein said context matching circuit of said address translation control circuitry includes a first comparing unit configured to (i) receive and compare said first context number with said context identification number and (ii) output a first comparing signal indicating whether said first context number is equivalent to said context identification number;

a first matching logic gate configured to (i) receive as inputs said first comparing signal and a context select bit and (ii) output a first context matching signal to said logic unit; and a second comparing unit configured to (i) receive and compare said second context number with said context identification number and (ii) output a second comparing signal indicating whether said second context number is equivalent to said context identification number;

an inverter configured to receive and complement said context select bit; and a second matching logic gate configured to (i) receive as inputs said second comparing signal and said complement of said context select bit and (ii) output a second context matching signal to said logic unit.

17. A computer system comprising:

a bus; and a processing unit coupled to said bus, said processing unit including a processor requesting translation of a requested virtual address, and a memory management unit coupled to said processor, said memory management unit including a translation look-aside buffer including a translation table, said translation table having at least one translation table entry including a pre-stored virtual address and a context identification number, and an address translation control circuitry, said address translation control circuit including a primary context storage element configured to contain a first context number, a group context storage element configured to contain a second context number, a context matching circuit configured to receive said first context number from said primary context storage element, said second context number from said group context storage element and said context identification number from the at least one translation table entry and to output at least one context matching signal indicating whether said context identification number is equivalent to a selected context number being one of said first and second context numbers, a comparing unit configured to compare the pre-stored virtual address with the requested virtual address and to output a comparison signal indicating whether the pre-stored virtual address is equivalent to the requested virtual address, and a logic unit coupled to said context matching circuit and said comparing unit, said logic unit being configured to output a translation Hit signal if said context matching signal indicates that said context identification number is equivalent to said selected context number and said comparison signal indicates that the pre-stored virtual address is equivalent to the requested virtual address.

18. A method for translating a virtual address from an electronic device to a physical address through the use of a translation look-aside buffer, the method comprising the steps of:

loading a first context number into a primary context storage element;

loading a second context number into a group context storage element;

obtaining a tag portion of a translation table entry of a translation table of the translation look-aside buffer associated with the virtual address, said tag portion including a context select bit, a context identification number and a pre-stored virtual address;

selecting one of said first and second context numbers;

comparing said one of said first and second context numbers to said context identification number;

comparing said pre-stored virtual address to the virtual address;

transmitting a translation Hit signal, provided (i) said one of said first and second context numbers is equivalent to said context identification number and (ii) said pre-stored virtual address is equivalent to the virtual address.

19. The method according to claim 18 further comprising the step of transmitting a translation Miss signal, provided (i) said one of said first and second context numbers is not equivalent to said stored context number or (ii) said stored virtual address is not equivalent to the virtual address.

20. The method according to claim 18, wherein said selecting step includes the steps of determining a state of said context select bit; and selecting said second context number if said context select bit is active and alternatively selecting said first context number if said context select bit is inactive.

* * * * *